O. G. ERICKSON.
HEATING JACKET FOR CARBURETERS.
APPLICATION FILED JAN. 12, 1915.

1,247,096.

Patented Nov. 20, 1917.

Inventor
O. G. Erickson

Witnesses
W. H. Woodson.
W. H. Woodman.

By R. Hartney
Attorneys

O. G. ERICKSON.
HEATING JACKET FOR CARBURETERS.
APPLICATION FILED JAN. 12, 1915.
1,247,096.
Patented Nov. 20, 1917.
2 SHEETS—SHEET 2.
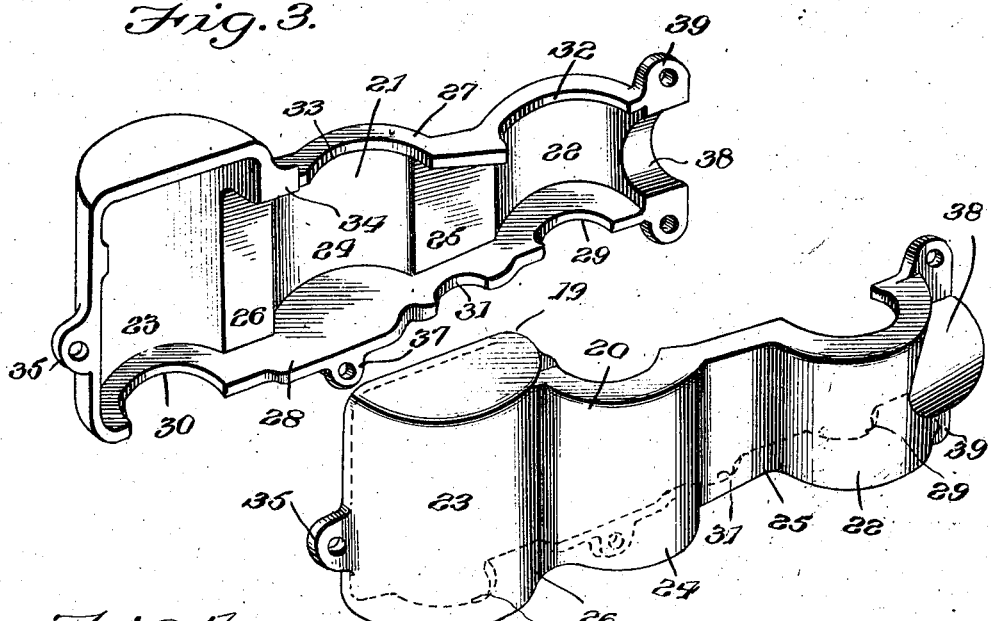
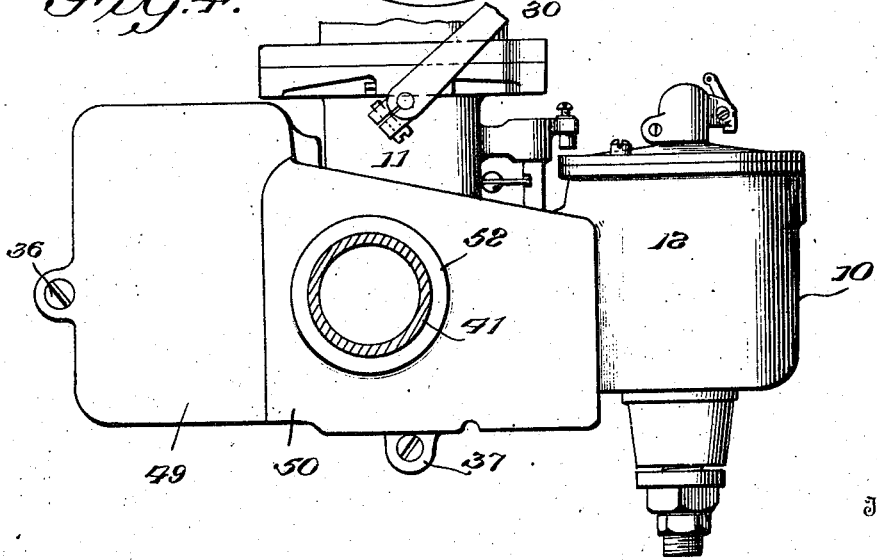
Witnesses
Inventor
O. G. Erickson
By
Attorneys

UNITED STATES PATENT OFFICE.

OSCAR G. ERICKSON, OF DETROIT, MICHIGAN.

HEATING-JACKET FOR CARBURETERS.

1,247,096.    Specification of Letters Patent.    Patented Nov. 20, 1917.

Application filed January 12, 1915. Serial No. 1,782.

*To all whom it may concern:*

Be it known that I, OSCAR G. ERICKSON, a citizen of the United States, residing at Detroit, in the county of Wayne and State of Michigan, have invented certain new and useful Improvements in Heating-Jackets for Carbureters, of which the following is a specification.

My present invention relates to new and useful improvements in heating jackets or casings for carbureters, the primary object of my invention being the provision of a heating jacket particularly adapted for use with Rayfield carbureters.

A further object of my invention consists in the provision of a two-part casing or jacket, the parts of which, when assembled, inclose the greater portion of the carbureter including the auxiliary air intake and the main air intake, the casing sections having mating or opposed flanges which engage throughout a portion of their length against each other and throughout the remainder of their extent against certain walls of the carbureter proper.

A still further object of my invention is to provide a casing of the above described character which shall conform to the superficial contour of the carbureter to which it is applied and at the same time provide ample space for circulation of the heated air.

In this connection I provide means for regulating the temperature of the air admitted to the casing and a further object of my invention consists in so constructing the parts of the casing as to permit them to detachably engage about the end of t e hot air supply pipe, thereby avoiding the necessity of a threaded or similar connection between the pipe and casing.

A still further object of my invention consists in constructing the parts of the casing in such a manner that they may be firmly secured to each other and to the carbureter by the employment of a few clamp screws, the casing sections being so formed that they will not be seriously displaced with respect to the carbureter, even by loosening of the screws.

With these and other objects in view, my invention will be more fully described, illustrated in the accompanying drawings, and then specifically pointed out in the claims which are attached to and form a part of this application.

In the drawings:

Fig. 3 is a perspective view of the two casing sections removed from the carbureter;

Fig. 4 is a view corresponding to Fig. 1, illustrating a somewhat modified form of casing construction;

Corresponding and like parts are referred to in the following description and indicated in all the views of the drawings by the same reference characters.

Figure 1:
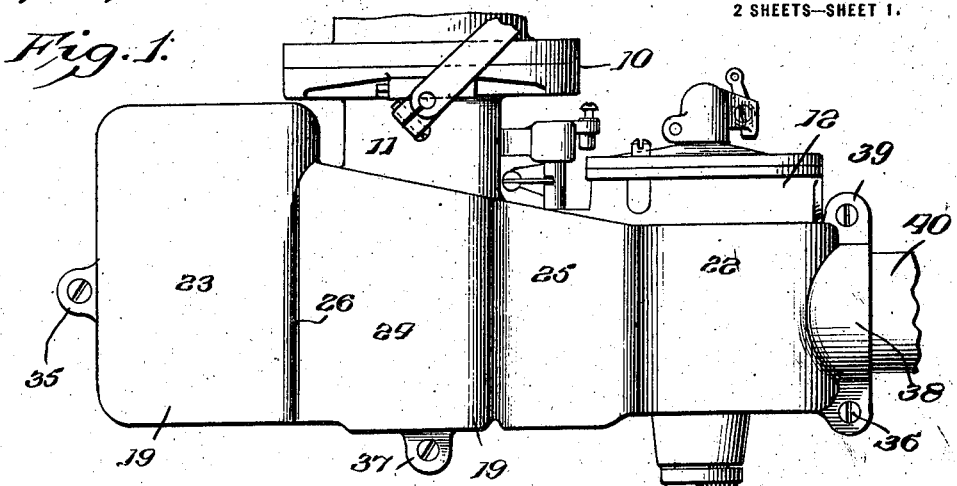
Figure 1 is a fragmentary elvational view of a carbureter, showing my improved heating jacket or casing applied thereto.

The heating jacket or casing forming the subject matter of my present invention is primarily intended for use upon a carbureter of the type conventionally shown at 10 which includes an intermediate mixing chamber 11, a float chamber 12 disposed at one side of the mixing chamber, and an auxiliary air inlet valve mechanism 13 disposed at the opposite side of the mixing chamber, these three portions being in alinement with each other. As shown, the chambers 11 and 12 are connected by a reduced throat or passage 14 and the portions 11 and 13 are similarly connected as shown at 15. A gasolene supply nipple 16 leads into the bottom of the float chamber 12, this chamber being also provided with a drain plug 17. The chamber which houses the auxiliary valve mechanism is also provided with a drain cock 18. It will of course be understood that the carbureter, above described, does not constitute any part of my invention, but a slight understanding of its construction is necessary to fully understand the construction and application of my heating jacket.

My improved heating jacket, indicated as a whole by the numeral 19, includes two symmetrically formed casing sections 20 and 21, these sections being formed in lefts and rights, as will be readily understood from an inspection of Fig. 3. Each of these sections is preferably cast or formed from a single piece of metal, such as aluminum or brass and each includes terminal float chamber and auxiliary air valve mechanism inclosing portions 22 and 23, an intermediate mixing chamber inclosing portion 24 and portions 25 and 26 connecting the portions 22—24 and 23—24, respectively.

Each of the portions 22, 23 and 24 of each casing section is substantially semi-cylindrical in general shape, having a radius of curvature somewhat greater than the radius of curvature of the corresponding carbureter sections. Each casing section is provided at its upper edge with an inwardly extending flange 27 and at its lower edge with an inwardly directed flange 28, the ends of these flanges being parallel to each other, while the intermediate portions converge toward the end portion 22 of the casing, which end portion is considerably less in height than the end portion 23. These flanges 27 and 28 in effect form the top and bottom walls of the heating jacket and engage either against the walls of the corresponding portions of the carbureter or against each other.

That portion of the lower flange 28, carried by the portion 22 of the casing, is cut-away as at 29 to engage about the nipple 16 of the float chamber and the flange 28, adjacent its opposite end, is similarly cut-away at 30 to engage about the lower cylindrical terminal of the housing inclosing the auxiliary valve mechanism. The flange 28, adjacent the portion 25 of the casing, is also cut-away as at 31 to engage about the drain plug 17 of the carbureter, the remaining free edge portions of the flange 28 lying in a common vertical plane which, when the casing is applied to the carbureter, extends longitudinally beneath the carbureter and centrally thereof. The upper flange 27 of each section is cut-away arcuately as shown at 32 and 33 to engage about the upper portions of the float chamber 12 and mixing chamber 11, respectively, the flange between these portions engaging at its free edge against the connecting portion 14 of the carbureter. The flange 27 of each section extends over the upper end of the carbureter section 13, being spaced thereabove and the free edges of said portions of the casing flanges 27 engage against each other when the casing is assembled. Those portions of the flanges 27 of the casing sections located between the portions 23 and 24 of such sections are thickened as shown at 34 to wedge between the carbureter sections 11 and 13 and therefore hold the casing sections against either longitudinal or downward movement with respect to the carbureter unless they are drawn away from each other to a considerable extent.

The end portions 23 of the casing sections are provided with mating ears 35 to receive clamping bolts 36 and those portions of the flanges 28 below the mixing chamber are provided with downwardly depending mating ears 37 to receive further clamping bolts. The casing sections at their opposite ends, are cut-away arcuately as shown at 38 to provide a circular opening communicating with the interior of the casing or jacket when the sections are assembled and adjacent such opening with oppositely disposed mating ears 39 to receive further clamping screws 37.

As a means for supplying heated air to the casing, I provide an intake pipe preferably in the form of a T-shaped pipe coupling 40, one branch 41 of which is proportioned to be clampingly engaged in the opening formed by the cut-away portions 38, another branch 42 of which is adapted to communicate with the open air and the other branch 43 of which is adapted to communicate with a pipe, not shown, leading from a heating jacket about the exhaust manifold of an engine. A butterfly valve 44 is mounted in the branch 41 of this coupling to control the amount of air admitted to the heating jacket and butterfly valves 45 and 46 are mounted in the branches 42 and 43, respectively, of the coupling. The valve levers 47 of the valves 45 and 46 are connected by a link 48 in such a manner that a partial or complete opening of one valve will cause a corresponding closing of the other, one being fully open when the other is fully closed.

Any suitable mechanism, not shown, may lead from the dash of the vehicle to one of the valve levers 47 and to the valve lever of the valve 44 to permit manual adjustment of the valves. This mechanism should, however, permit adjustment of the valve 44 independently of the valves 45 and 46.

Figure 2:
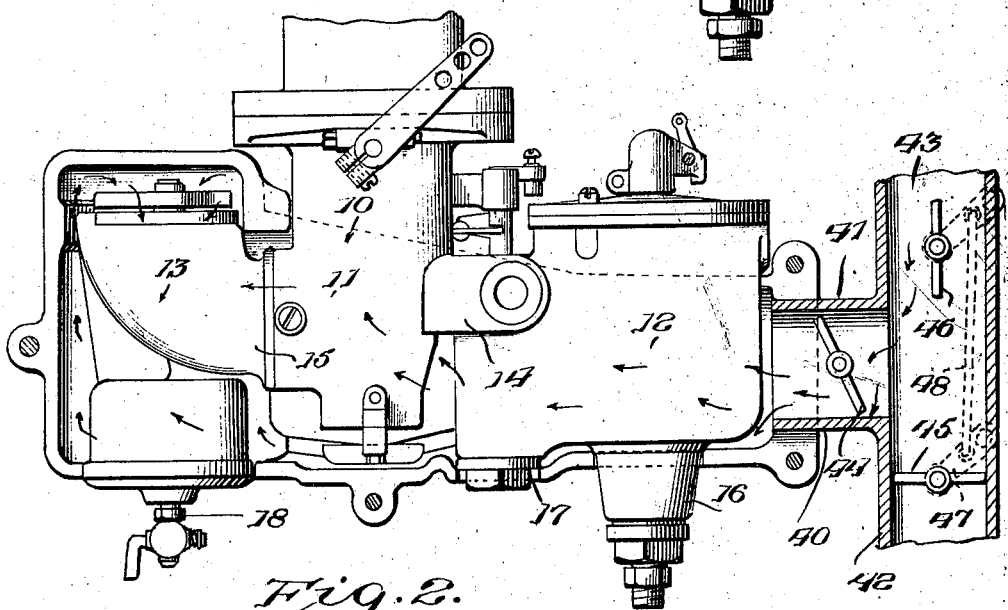
Fig. 2 is a similar view, showing one casing section removed to illustrate certain details in the casing construction and also showing the air controlling valves and air pipe in section.

In operation, the casing sections 20 and 21 are positioned about the carbureter in the manner shown in Figs. 1 and 2 of the drawings and secured in place by clamp screws 36. If the carbureter casting is rough or irregular, cement or strips of fiber packing may be interposed between the ends of the casing sections and between the edges of their flanges and the body of the carbureter to insure absolutely air tight joints. When the casing is so applied, it will be clear that not only will the carbureter be almost completely surrounded by the heating jacket, in such a manner that both its float and mixing chambers will be heated, but all air supplied to the carbureter will be supplied through the coupling 40. By adjusting the valves in the manner shown in Fig. 2, all the air supplied will be highly heated and by reverse adjustment of the valves 45 and 46 cold air alone may be supplied, it of course being apparent that air at any temperature, between these extremes, may be supplied by proper intermediate adjustment of the valves.

It should be noted that all the hot air entering the heating jacket is drawn through the carbureter and employed in the formation of the explosive mixture. Therefore, only as much hot air can be drawn into the jacket as can be used by the carbureter and it is, therefore, important that the chamber or space between the heating jacket and carbureter have the smallest possible volume, providing a sufficient layer or blanket of hot air is provided around the carbureter, in order that the circulation of hot air through the chamber may be as rapid as possible so that the carbureter will be raised to the highest possible heat. In other words, if the chamber is unduly large, the air will be drawn into it slowly and will be cooled both in its passage from the source of supply to the jacket and while in the jacket, with the result that the carbureter will not be as efficiently heated and will draw in cooler air.

Figure 5:
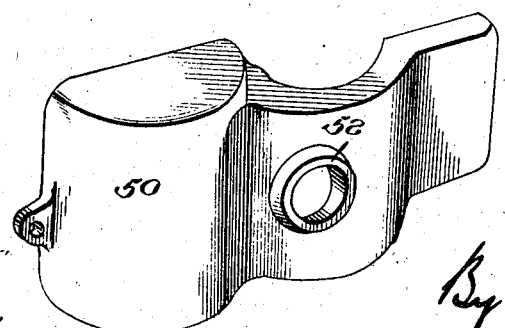
Fig. 5 is a perspective view of one of the casing members employed in the construction shown in Fig. 4.

In Figs. 4 and 5, I have illustrated a somewhat modified form of construction including a casing 49 in the form of two mating sections 50. In this form, the heating jacket or casing incloses the mixing chamber and that portion of the carbureter casing inclosing the auxiliary air valve mechanism, the float chamber being left exposed. The branch 41 of the T-shaped coupling 40, in this instance, is inserted in a flanged opening 52 formed in that portion of one of the casing sections which engages about the mixing chamber. Aside from the above distinctions, the form of casing illustrated in Figs. 4 and 5 is identical with that previously described and any further explanation of its construction and operation is, therefore, believed to be unnecessary.

Having thus described the invention, what is claimed as new is:

1. A heating jacket for carbureters including mating sections of greater height at one end than the other and conforming to and adapted to embrace opposite sides of the carbureter, each section including semi-cylindrical portions and intermediate portions connecting said semi-cylindrical portions, the semi-cylindrical and intermediate portions all having upper and lower flanges which space the side walls of said sections a relatively short distance from the carbureter to form an intermediate constricted heating chamber, parts of said upper flanges being thickened for wedging engagement with the adjacent portion of the carbureter, the large end of the jacket being closed and the small end thereof provided with an opening, an air intake pipe fitting within said opening, and means clamping the sections in assembled position upon the carbureter and in contact with the air intake pipe, that portion of the jacket between the opening and the closed end thereof extending for a portion only of the height of the side walls of the carbureter to permit of adjustment of said carbureter without removing the jacket.

2. A heating jacket for carbureters including mating sections conforming to and adapted to embrace the opposite sides of a carbureter, each section of the jacket being provided with inwardly projecting upper and lower flanges extending the entire length thereof which space the side walls of the sections from the carbureter to form an intermediate constricted heating chamber, the upper flanges being disposed at an angle to the lower flanges, the front end of the jacket being closed and the rear end thereof provided with an opening, an air intake pipe fitting within said opening, a perforated lug extending longitudinally from each section of the jacket at the closed end thereof, upper and lower perforated lugs extending in a vertical plane from each section at the opening in the jacket, an intermediate perforated lug projecting from the bottom of each jacket section, and fastening devices extending through the perforations in all of the lugs for clamping the sections of the jacket in assembled position around the carbureter and in contact with the intake pipe, that portion of the jacket between the opening and the closed end thereof being adapted to extend for a portion only of the height of the side walls of the carbureter to permit of adjustment of the said carbureter without removing the jacket.

3. A heating jacket for carbureters including a sectional body, the sections of which are adapted to be clamped together to secure it to and inclose the float chamber and air intake of a carbureter, the body being formed with an opening for admission of heated air at the part most remote from that adapted to inclose the air intake of the carbureter whereby the heated air admitted will be swept over all portions of a carbureter inclosed in the body and the body being further shaped and proportioned to provide, with a carbureter, an intermediate hot air chamber which will maintain a hot air blanket of substantially uniform thickness completely surrounding all inclosed carbureter portions whereby, for the thickness of the air blanket provided, the volume of the chamber will be reduced to a minimum so that the maximum rate of air circulation through the chamber, caused by the limited suction through a carbureter by an engine, will be attained to insure the highest heating of the carbureter.

In testimony whereof I affix my signature in presence of two witnesses.

OSCAR G. ERICKSON.

Witnesses:
PAUL J. BROWN,
L. F. WARD.